Dec. 23, 1958
W. L. HOPKINS, JR
2,865,511
FILTER APPARATUS
Filed Dec. 28, 1955
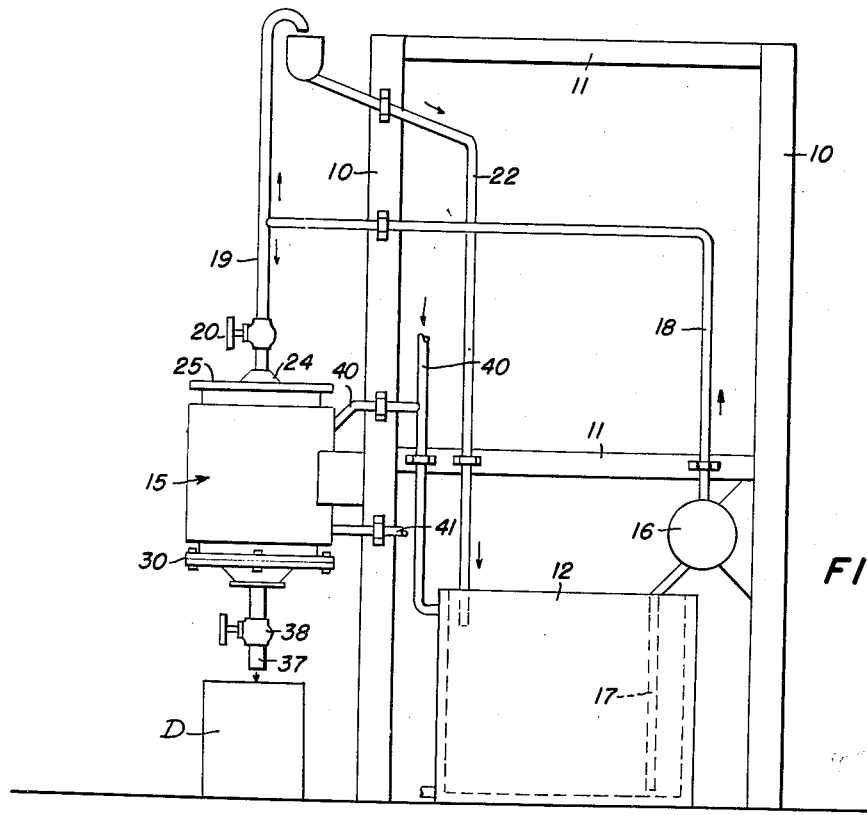
FIG.1
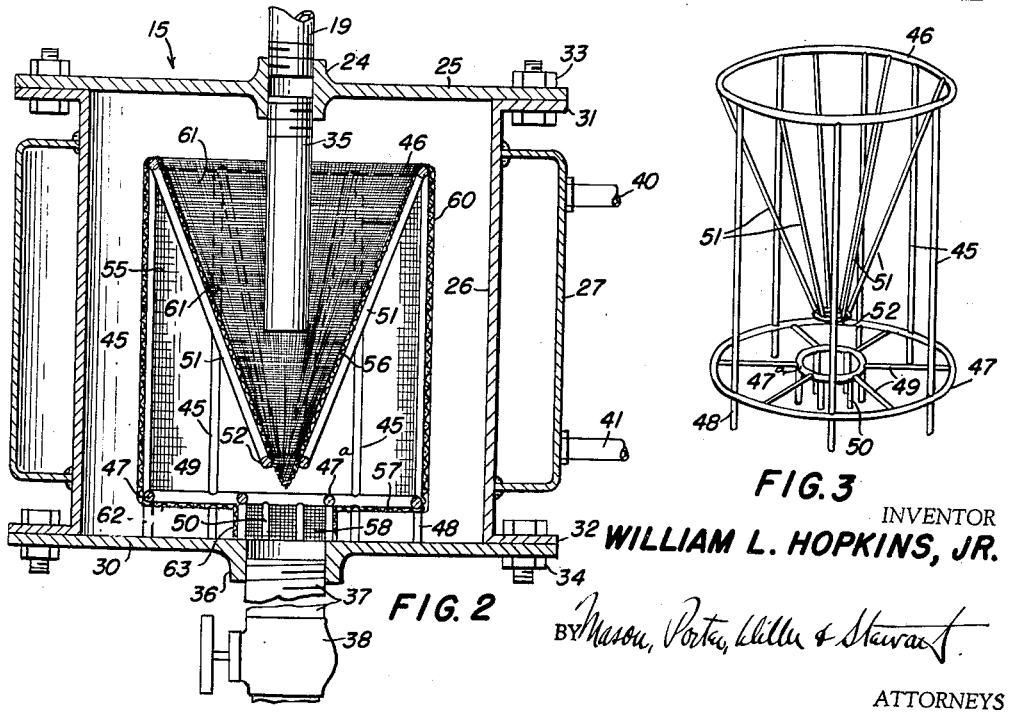
FIG.2
FIG.3
INVENTOR
WILLIAM L. HOPKINS, JR.
BY Mason, Porter, Miller & Stewart
ATTORNEYS United States Patent Office 2,865,511
Patented Dec. 23, 1958

2,865,511

FILTER APPARATUS

William L. Hopkins, Jr., Savannah, Ga., assignor to G and A Laboratories, Inc., Savannah, Ga., a corporation of Georgia Application December 28, 1955, Serial No. 555,927

12 Claims. (Cl. 210—416)

This invention relates to filter apparatus which is particularly useful in the purifying of fluids, especially hot liquids.

An object of the invention is to provide a filter apparatus having a filter chamber with a filter unit therein, means for supplying the fluid into the chamber under a predetermined head, and including parts whereby the filter unit may be removed and cleaned without disconnection of the supply means.

Another object is the provision of a filter chamber comprising a bell and a separable closing bottom portion, together with a filter unit connected to the bottom portion for separation therewith.

A further object is the provision of a filter unit having a strong frame with a filter reinforcing element supported by the frame, and a filtering element supported by the reinforcing element, the frame providing mounting means for the unit.

A further object is the provision of a filter apparatus having a filter chamber with a separable bottom, a filter unit having a frame connected to the bottom and a filtering element supported by the frame and having a reentrant portion within the frame and a peripheral portion surrounding the frame, and means for delivering the liquid to be filtered into said reentrant portion at a level below the top of the frame.

With these and other objects in view, as will appear in the course of the following description and claims, an illustrative form of practice is shown on the accompanying drawings, in which:

Fig. 1 is an elevation of a filter apparatus according to this invention;

Fig. 2 is an upright axial section through the filter chamber of Fig. 1;

Fig. 3 is a perspective view of a frame for the filter unit of Fig. 2.

In these drawings, the invention is shown as employed in the filtering of molten rosin.

In Fig. 1, a scaffold is formed by legs 10 and cross braces 11. A reservoir 12 is provided for the molten rosin to be filtered; in the illustrative form, it can be provided with a steam jacket for maintaining the rosin in liquid form. A filter chamber 15 likewise is provided with a steam jacket and is supported from the scaffold. A pump 16 draws the liquid from reservoir 12 by the pipe 17 and delivers it by pipe 18 to an intermediate point of the standpipe 19 above a valve 20 at the lower end of the standpipe. The upper end of the standpipe is rebent, so that excess liquid can be visibly discharged into the upper end of a reflux pipe 22 for return to the reservoir 12. It is preferred to provide the several pipes with lagging for maintaining the temperature of the liquid: and the several pipes can be mounted on the scaffold.

The lower end of standpipe 19 is threaded into a hollow boss 24 on the top plate 25 of the filter unit 15, Fig. 2, which has the peripheral wall 26 to which is welded the outer wall 27 for the steam jacket. The bottom of the filter chamber is formed by a plate 30. The peripheral wall 26 has flanges 31, 32 at its ends, to which the plates 25 and 30 are secured by the bolts 33, 34, with inclusion of sealing gaskets. Thus the top and peripheral walls 25 and 26 provide a bell which can be mounted in place with the pipe connections; and the bottom wall 30 is separable without disturbance of such mountings and connections. Within the filter chamber, the boss 24 is extended for threadedly receiving the drop pipe 35 which thus forms a part of the standpipe system. The bottom plate 30 has a boss 36 for receiving the discharge pipe 37 having a discharge valve 38 therein, and leading to the discharge point, e. g. above the drum D which is to receive the filtered rosin for storage and shipment. A steam pipe 40 and a condensate discharge pipe 41 communicate with the jacket space.

Within the filter chamber is provided a filter structure. A strong frame is formed, Fig. 3, of the upright bars 45 connected to the top ring 46 and the bottom ring 47, the lower ends of the bars 45 projecting as feet 48. An inner bottom ring 47a is connected by the radial struts 49 to the outer ring 47, these bottom parts being in a plane in the illustrative form. Feet 50 are secured to the inner ring 47a. These parts may be formed of stainless steel and fixedly connected as by welding or brazing.

The downwardly and inwardly inclined rods 51 are secured by welding or brazing to the top ring 46, and their lower ends are connected by a small ring 52 likewise secured. It is preferred to have the struts 49 connected to the bottom ring 47 at points midway between the connections to the bars 45; and likewise to alternate the connections of bars 45 and rods 51 to the top ring.

A coarse-meshed peripheral portion, here illustrated as a cylinder 55, Fig. 2, is formed of large diameter wire, and placed around the bars 45, overlapping the rings 46, 47. A reentrant portion, here illustrated as cone 56 of like material, is formed with its base located to rest on the upper ring 46, and its apex within the frame so that the cone 56 is supported by the rods 51 and the small ring 52. A circular sheet 57 of like material is formed with a central aperture and with peripheral notches to fit around the feet 48. A small cylinder 58 of like material is placed at the central aperture of sheet 57 and fits around the feet 50. These coarse mesh parts are placed in position and brought to engagement at their edges, and are secured by welding or brazing to one another and to adjacent parts of the frame. It is preferred to form them of non-corrodible material such as stainless steel.

A fine-meshed fabric 60 is tensioned around the cylinder 55 and its overlapped ends held and sealed together as by welding. A cone 61 of like material is formed, with its edges likewise sealed, and inserted in the cone 56. A sheet 62 of like material is applied beneath the sheet 57. A small cylinder 63 of like material is formed around cylinder 58, and its edge sealed. The adjacent edges of these several parts are connected and sealed as by welding. These parts likewise may be of stainless steel.

Therewith a strong unit is provided, having an internal frame with projecting feet, a reinforcing structure around and at the bottom of the frame and having a top reentrant cone, and a filtering structure presenting several surfaces and supported by the reinforcing structure against movement in the direction of filtering flow.

This filtering unit is then placed upon the bottom plate 30 so that the feet 48, 50 rest thereon, with the space within the cylinders 58, 63 above the opening in the boss 36; and the cylinder 58 is sealed to the plate 30 as by welding. Therewith the plate 30 is connected to the filter unit, so that the unit is moved to proper operative position when the plate 30 is assembled and secured to flange 32; and can be removed therewith for inspection and cleaning.

In operation, with the parts assembled, the pump 16 is started, so that the liquid flows by pipe 18 to standpipe 19 and passes downward through valve 20 and drop pipe 35 so that it enters the space within the conical filter 61 at a low level thereof, with the transfluent in part entering the filter unit through this filter 61 and in part filling the space and then overflowing the upper edge and passing downward over the cylindrical filter 60. The pump capacity is preferably selected as greater than the filtering throughput at the beginning of the operation, so that the pumped liquid also ascends in the standpipe and provides a liquid column which establishes a hydrostatic filtering pressure, with a maximum determined by the overflow to return pipe 22. Thus the filter surfaces are protected against excessive pressure which might rupture them.

As the flow continues, the several filtering surfaces are active, and the chamber space may become filled, noting that the standpipe pressure is effective even with air under pressure above the liquid level.

The impurities such as sand, bark, leaves, etc., in the rosin are detained by the filter surfaces, while the transfluent moves through the meshes. The delivery of the pumped liquid through the drop pipe 35 causes it to leave the surface of the conical filter 61, washing the particles upward and over the edge; and likewise the downward flow along the cylindrical filter 60 laves its surface. Thus, toward the end of a filtering run, the particles have largely been carried to the bottom of the chamber and overlie plate 30; noting that the filtering surfaces 62, 63 have continued to permit the movement of transfluent so that the particles tend to form a coherent filter cake with a minor content of the liquid.

The rate of filtration can be observed by the discharge from the pipe 37. If a slowing down indicates a clogging, the valve 20 may be more or less shut down, so that the filter chamber partly empties, and then opened again so that a rapid flow accomplishes a greater laving effect.

At the end of a run, the pump 16 is stopped, and the pipes allowed to drain. If an intermediate cleaning is necessary, the valve 20 may be closed, and the pump circulation maintained to avoid freezing. The bolts 34 are released and the bottom plate 30 lowered, with the filter unit and the trapped particles thereon. The particles can be scraped and rinsed away, and the filter surfaces cleaned by air blast or solvent.

The valve 38 permits interrupting the operation when a filled drum D is to be removed and an empty one substituted.

As an example of practice, with all parts of the filter unit of stainless steel, the external diameter was about 6½ inches, with a length of about 8 inches, the feet 48 projecting about ¾ inch. The internal cone had a depth of 7 inches. The small bottom cylinder had a diameter of 2¼ inches. The frame and feet were of $3/16$ inch round rods. The reinforcing structure was of 0.035 inch #304 stainless steel wire, formed with 12 x 12 meshes per inch. The filter surfaces were provided by 0.0045 inch #304 stainless steel, formed with 100x100 meshes per inch. The standpipe hydrostatic pressure was 10 feet. In operation, there was a rapid through-flow for 15–20 seconds, and thereafter the rate lessened. 30,000 pounds of molten commercially collected rosin have been moved through such a unit in less than an hour of total time, including the shut-downs for changing drums, and without an intermediate cleaning.

It is obvious that the invention is not limited to the illustrative form, and that the same may be employed in many ways within the scope of the appended claims.

What is claimed is:

1. A filtering apparatus comprising walls providing a filter chamber, a filter structure within the chamber having a peripheral portion and an upwardly open reentrant tapered portion within the peripheral portion, said tapered portion converging downwardly, said peripheral portion being spaced from the chamber walls, the space between the chamber walls and the peripheral portion being in free communication above the upper edge of the peripheral portion with the space within the reentrant portion so that material entering said reentrant portion may overflow said upper edge and flow downwardly along the outer surface of the peripheral portion, and means for supplying the fluid to be filtered into said chamber, said means including a conduit in part located within the said tapered portion and having an opening communicating with the space within the said tapered portion.

2. A filtering apparatus comprising a filter chamber, a standpipe extending upward from said filter chamber and having a downward extension into the filter chamber, a supply vessel, a pump connected for delivering material from the supply vessel into said standpipe at a point above the filter chamber, an overflow return duct from the top of the standpipe, a filter structure within the filter chamber comprising a peripheral portion and an upwardly open reentrant portion within the peripheral portion and spaced therefrom for providing a reception chamber for the filtered material, and a discharge duct communicating with the said reception chamber, said downward extension terminating within the reentrant portion below the level of the junction of the said peripheral and reentrant portions, the said peripheral portion being spaced from the walls of said filter chamber, the space between the filter chamber walls and the peripheral portion being in free communication with the said reception chamber above the upper edge of the peripheral portion so that incoming material can overflow the junction of the peripheral and reentrant portions into the space between the chamber walls and the peripheral portion and flow downward over the outer surface of the peripheral portion.

3. A filtering apparatus as in claim 2, in which a valve is provided in the standpipe, between the point of pump delivery and said conduit opening.

4. A filtering apparatus comprising a rigid frame of vertical bars connected at the top and near the bottom by rings; a filter structure including a peripheral portion surrounding and connected to the bars and rings, a tapered reentrant portion having its larger upper end supported by the upper ring, and a bottom closing portion below and connected to the lower ring; said bottom closing portion having an opening.

5. A filtering apparatus comprising a rigid frame of vertical bars connected at the top and near the bottom by rings; a filter structure including a peripheral portion surrounding and supported by the bars, a tapered reentrant portion having its larger upper end supported by the upper ring, and a bottom closing portion below and supported by the lower ring, said bottom closing portion having an opening; downwardly and inwardly inclined rods connected at their tops to said top ring, and a small ring connected at the lower ends of said rods, said bars being in supporting relation to said reentrant portion.

6. A filtering apparatus comprising a rigid frame of vertical bars connected at the top and near the bottom by rings; a filter structure including a peripheral portion surrounding and supported by the bars, a tapered reentrant portion having its larger upper end supported by the upper ring, and a bottom closing portion below and supported by the lower ring, said bottom closing portion having an opening; said bars projecting as feet below the bottom closing portion.

7. A filtering apparatus comprising a rigid frame of vertical bars connected at the top and near the bottom by rings; a filter structure including a peripheral portion surrounding and supported by the bars, a tapered reentrant portion having its larger upper end supported by the upper ring, and a bottom closing portion below and supported by the lower ring, said bottom closing portion having an opening; a smaller bottom ring, and struts connecting said bottom rings.

8. A filtering apparatus as in claim 7, in which feet are connected to and project downward from the smaller bottom ring.

9. A filtering apparatus as in claim 8, in which a filter structure surrounds and is supported by the feet on said smaller ring.

10. A filtering apparatus comprising a rigid frame of vertical bars connected at the top and near the bottom by rings; a filter structure including a peripheral portion surrounding and supported by the bars, a tapered reentrant portion having its larger upper end supported by the upper ring, and a bottom closing portion below and supported by the lower ring, said bottom closing portion having an opening; said filter structures being comprised of an inner strong coarse-meshed fabric supported by the bars and rings, and of an outer weaker fine-meshed fabric supported by the inner fabric; the bars, rings, and fabric being of non-corrodible metal and secured together in supporting and sealing relationship.

11. A filtering apparatus as in claim 6, including a support plate having an aperture alined with said opening, and a filtering conduit structure secured to the bottom closing portion and the support plate in sealed relation for communication between the aperture and opening.

12. A filtering apparatus comprising walls providing a filter chamber and including a separable bottom plate having a discharge opening for filtered liquid, a filter structure within the filter chamber having a peripheral portion and an upwardly open reentrant tapered portion within the peripheral portion, said peripheral portion being spaced from the filter chamber walls, the space between the peripheral portion and the reentrant portion constituting a reception chamber for filtered material, said filter structure being connected to the bottom plate for removal therewith and with said peripheral portion held with its bottom edge located above the said bottom plate for providing a space above said bottom plate for the collection of detained material; means for supplying the fluid to be filtered into said filter chamber and including a conduit opening within the said tapered portion, and communication means connecting the said reception chamber with said discharge opening.

References Cited in the file of this patent

UNITED STATES PATENTS

| | | |
|---|---|---|
| 200,405 | Mendenhall | Feb. 19, 1878 |
| 473,949 | McGowan | May 31, 1892 |
| 911,388 | Franke | Feb. 2, 1909 |
| 1,218,975 | Brison | Mar. 13, 1917 |
| 1,585,246 | Hoy | May 18, 1926 |
| 1,652,423 | Belke | Dec. 13, 1927 |
| 1,688,846 | Andrews | Oct. 23, 1928 |
| 2,044,096 | Moran | June 16, 1936 |
| 2,057,219 | Vokes | Oct. 13, 1936 |
| 2,427,320 | Zech | Sept. 9, 1947 |
| 2,496,757 | Sieling | Feb. 7, 1950 |

FOREIGN PATENTS

| | | |
|---|---|---|
| 16,111 of 1928 | Australia | May 27, 1929 |